W. Edson.
Hydrometer.
N° 48,620. Patented Jul. 4, 1865.
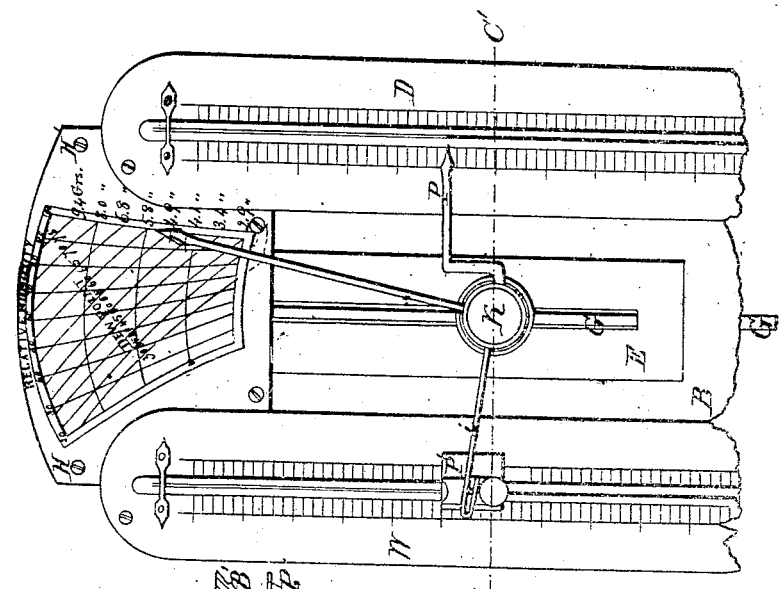
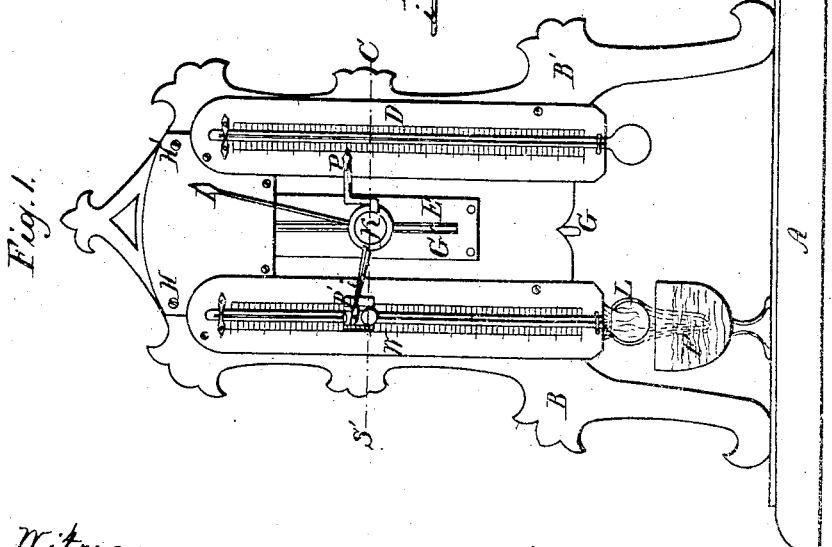
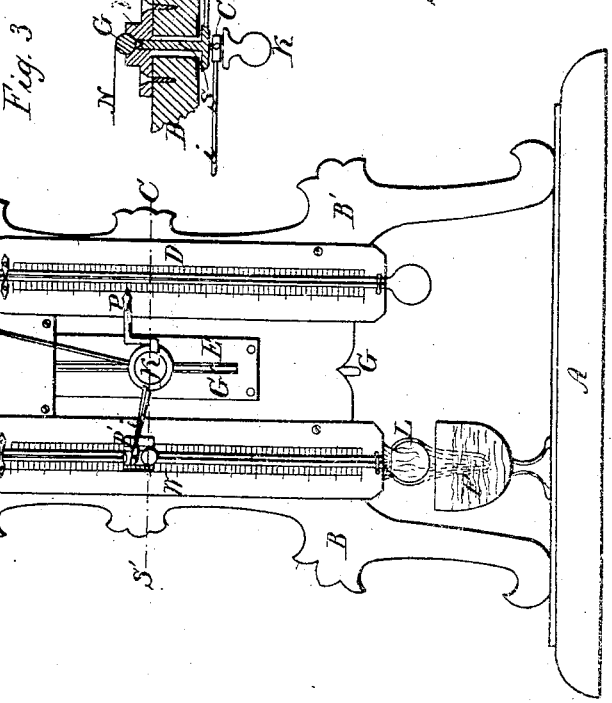
Witnesses
Abra'm Bailey
Albert H. Shedd
Inventor
William Edson

UNITED STATES PATENT OFFICE.

WILLIAM EDSON, OF BOSTON, MASSACHUSETTS, ASSIGNOR TO SHEDD & EDSON, OF SAME PLACE.

IMPROVEMENT IN HYGROMETERS.

Specification forming part of Letters Patent No. 48,620, dated July 4, 1865.

*To all whom it may concern:*

Be it known that I, WILLIAM EDSON, of Boston, county of Suffolk, and State of Massachusetts, have invented a Hygrometrical Index, the nature of which consists in a combination of pointers attached to a movable center and a diagram, all of which, in connection with a Mason's hygrometer, or, as it is more commonly called, "the wet and dry bulb hygrometer," will enable any one, by simple inspection of the instrument, to ascertain the relative humidity and dew-point of the air, also the absolute amount of moisture in the air, without the aid of tables or calculation; and I do hereby declare that the following is a full and exact description of the same, which, together with the accompanying drawings and letters of reference marked thereon, will enable any one skilled in the art to make and use my invention.

In the drawings, Figure 1 is an elevation; Fig. 2, elevation of a part enlarged to full size; Fig. 3, section through S′ C′.

A, B, and B′ in Fig. 1 are the base and standard, made of any suitable material; W and D, two thermometers attached to the standard B and B′. The bulb of the thermometer D is exposed to the air. That of W is inclosed in silk, L, which is connected with and always kept moist by means of some strands of lamp-wick hanging into the water in the vessel F.

This instrument constitutes the well-known Mason hygrometer, which acts upon the principle that evaporation cools the body from which it evaporates, and, as has been found by experiment, this cooling is in proportion to the rapidity with which the evaporation proceeds, which, again, is in proportion to the dryness of the air in which the evaporation takes place. In other words, the lowering of the temperature of the covered bulb is in proportion to the dryness of the air in which it is placed.

K, Fig. 3, is a knob fastened to the stud S; S, stud, one end of which forms a center around which the points I i swing; G, in all the figures, a piece of wire, to which is attached the stud S; V V, guides, one of which only is shown, in which the wire G slides up and down; N, spring for the purpose of holding the wire G in place and to bring upon it a gentle pressure, so that it, together with the stud S, the knob K, and pointers P I i, may stand in any position in which they may be placed; P, in all the figures, a pointer permanently attached to the stud S. The use of this pointer is to enable the observer to adjust the stud S, around which the pointers I i swing, to the mercury of the dry-bulb thermometer; I i, in all the figures, pointers permanently fixed to the collet C, Fig. 3, and swinging with the collet C freely around the stud S as a center; P′, in Figs. 1 and 2, a small slide attached to the pointer i, for convenience in adjusting the instrument to the wet-bulb thermometer.

It will be seen that the pointers I i are fixed in relation to each other, and that one cannot move without the other. Thus in moving the pointer i to adjust it to the mercury of the wet-bulb thermometer a corresponding movement is made by the pointer I over the face of the diagram H H′.

H H′ in Figs. 1 and 2 is a diagram containing lines and numbers which indicate relative humidity, the dew-point, and absolute amount of watery vapor in the air. The curved lines—nearly horizontal—are drawn merely for convenience in making the diagram, and correspond to the lines indicating temperature on the dry-bulb thermometer. The curved lines—nearly vertical—are lines of equal relative humidity, and may be termed "isohygrometrical lines," the numbers at the upper end of these are to be read as percentages of moisture—that is, as relative humidity. The lines running diagonally from left down to the right are dew-point lines. The numbers upon them under the words "dew-point" indicate the dew-point of the air when the pointer falls upon that line. The numbers in the vertical column at the right express the number of grains of water (in the form of watery vapor) in the air corresponding to the dew-point.

In making an observation for the purpose of finding the absolute amount of vapor, I adjust the instrument—that is, arrange the pointers so that P shall point to the mercury of the dry-bulb, and i to that of the wet-bulb—observe at which diagonal line the pointer I stands, follow this line down, and the number in the vertical column at the right, to which it runs, gives the number of grains of watery vapor in the air. This diagram, after all of the mechanical parts of the instrument are completed, is easily projected by aid of the well-known hygrometric tables.

What I claim as my invention, and desire to secure by Letters Patent, is—

1. The combination of indices in such a manner that when one is placed at the height of the mercury in a dry-bulb thermometer and another at the height of the mercury in a wet-bulb thermometer a third point will indicate on a scale the proportion of moisture in the atmosphere, substantially as and for the purpose set forth.

2. A diagram of lines so combined with a scale of figures and so constructed or drawn as to indicate the relative humidity of the air, the dew-point, and the absolute amount of moisture, either or all, when pointed out by an index whose position is regulated by adjustment to the height of the mercury in wet and dry bulb thermometers, substantially as and for the purpose set forth.

WILLIAM EDSON.

Witnesses:
ABRAM BAILEY,
ISAAC K. HARRIS.